United States Patent
Goetz et al.

(10) Patent No.: US 9,785,456 B2
(45) Date of Patent: Oct. 10, 2017

(54) METADATA-DRIVEN DYNAMIC SPECIALIZATION

(71) Applicant: Oracle International Corporation, Redwood City, CA (US)

(72) Inventors: Brian Goetz, Williston, VT (US); John R. Rose, San Jose, CA (US); Alexander R. Buckley, Cupertino, CA (US)

(73) Assignee: Oracle International Corporation, Redwood City, CA (US)

( * ) Notice: Subject to any disclaimer, the term of this patent is extended or adjusted under 35 U.S.C. 154(b) by 152 days.

(21) Appl. No.: 14/660,143

(22) Filed: Mar. 17, 2015

(65) Prior Publication Data

US 2015/0301812 A1    Oct. 22, 2015

Related U.S. Application Data

(60) Provisional application No. 61/982,802, filed on Apr. 22, 2014.

(51) Int. Cl.
*G06F 9/45*        (2006.01)
*G06F 9/455*       (2006.01)
(Continued)

(52) U.S. Cl.
CPC .......... *G06F 9/45516* (2013.01); *G06F 8/315* (2013.01); *G06F 8/437* (2013.01);
(Continued)

(58) Field of Classification Search
CPC .......... G06F 11/3692; G06F 8/48; G06F 8/52; G06F 9/44521; G06F 9/465; G06F 17/21;
(Continued)

(56) References Cited

U.S. PATENT DOCUMENTS 5,628,016 A    5/1997   Kukol
5,677,312 A    10/1997  Kon et al.
(Continued)

FOREIGN PATENT DOCUMENTS

WO    2004102303    11/2004

OTHER PUBLICATIONS

Sunil Soman, et al., "Efficient and General On-Stack Replacement for Aggressive Program Specialization", 2006 International Conference on Programming Languages and Compilers (PLC'06), Jun. 26-29, pp. 1-9, Las Vegas, NV.

(Continued)

*Primary Examiner* — Tuan Vu
(74) *Attorney, Agent, or Firm* — Robert C. Kowert; Meyertons, Hood, Kivlin, Kowert & Goetzel, P.C.

(57) ABSTRACT

Metadata-driven dynamic specialization may include applying a type erasure operation to a set of instruction in a generic class or to a method declaration that includes typed variables using an encoded form of an instruction or an argument to an instruction. The instruction may operate on values of the reference types and the argument may be a signature that indicates the reference types. The encoded form may be annotated to include metadata indicating which type variables have been erased and which reference types are the erasures of type variables. Additionally, the metadata may indicate that the instruction operates on values of, and that the argument indicates reference types that are erasures of, the type variables of the class (or method) declaration. Moreover, the encoded form of the instruction or argument may be used directly without specialization or transformation.

20 Claims, 7 Drawing Sheets

(51) Int. Cl.
  *G06F 9/445* (2006.01)
  *G06F 9/44* (2006.01)
(52) U.S. Cl.
  CPC .............. *G06F 8/71* (2013.01); *G06F 9/443* (2013.01); *G06F 9/4428* (2013.01); *G06F 9/4433* (2013.01); *G06F 9/44521* (2013.01); *G06F 8/24* (2013.01)
(58) Field of Classification Search
  CPC . G06F 17/30073; G06F 9/443; G06F 9/45516
  See application file for complete search history.

(56) References Cited

U.S. PATENT DOCUMENTS

| | | | |
|---|---|---|---|
| 5,923,878 | A | 7/1999 | Marsland |
| 6,279,008 | B1 | 8/2001 | Tung Ng et al. |
| 6,360,360 | B1 | 3/2002 | Bates et al. |
| 6,513,152 | B1 | 1/2003 | Branson et al. |
| 6,757,890 | B1 | 6/2004 | Wallman |
| 7,000,219 | B2 | 2/2006 | Barrett et al. |
| 7,162,716 | B2 | 1/2007 | Glanville et al. |
| 7,966,602 | B1* | 6/2011 | Webster ............... G06F 8/48 717/114 |
| 8,079,023 | B2 | 12/2011 | Chen |
| 8,250,528 | B2 | 8/2012 | Meijer et al. |
| 8,438,551 | B2 | 5/2013 | Tonkin et al. |
| 8,863,079 | B2 | 10/2014 | Darcy et al. |
| 9,329,985 | B1* | 5/2016 | Stern ............... G06F 11/3692 |
| 2002/0032900 | A1 | 3/2002 | Charisius et al. |
| 2003/0018958 | A1 | 1/2003 | Wallman et al. |
| 2003/0079049 | A1 | 4/2003 | Sokolov |
| 2003/0079201 | A1 | 4/2003 | Sokolov |
| 2004/0006762 | A1 | 1/2004 | Stewart et al. |
| 2004/0221228 | A1 | 11/2004 | Day et al. |
| 2005/0055682 | A1 | 3/2005 | Gadre et al. |
| 2005/0114771 | A1* | 5/2005 | Piehler ............... G06F 17/21 715/264 |
| 2005/0193269 | A1 | 9/2005 | Haswell et al. |
| 2006/0048024 | A1 | 3/2006 | Lidin et al. |
| 2006/0143597 | A1* | 6/2006 | Alaluf ............... G06F 8/52 717/136 |
| 2006/0251125 | A1 | 11/2006 | Goring et al. |
| 2007/0256069 | A1 | 11/2007 | Blackman et al. |
| 2008/0033968 | A1 | 2/2008 | Quan et al. |
| 2008/0040360 | A1 | 2/2008 | Meijer et al. |
| 2008/0163235 | A1* | 7/2008 | Marvin ............... G06F 9/465 718/104 |
| 2008/0275910 | A1 | 11/2008 | Molina-Moreno et al. |
| 2008/0294740 | A1 | 11/2008 | Grabarnik et al. |
| 2009/0037459 | A1* | 2/2009 | Theobald .......... G06F 17/30073 |
| 2009/0271771 | A1 | 10/2009 | Fallows |
| 2010/0223606 | A1 | 9/2010 | Park et al. |
| 2011/0067013 | A1 | 3/2011 | Frost et al. |
| 2012/0005660 | A1 | 1/2012 | Goetz et al. |
| 2013/0305230 | A1 | 11/2013 | Inoue |
| 2013/0332943 | A1* | 12/2013 | Sun ............... G06F 9/44521 719/331 |

OTHER PUBLICATIONS

International Search Report and Written Opinion from PCT/US2015/026947, Date of Mailing Jul. 6, 2015, Oracle International Corporation, pp. 1-11.
Eric Allen, et al., "Efficient Implementation of Run-Time Generic Types for Java", Mar. 3, 2006, Retrieved from the Internet: URL: http://web.archive.org/web/20060303102205/http://www.cs.rice.edu/javaplt/paper/wcgp2002.pdf, pp. 1-28.
Robert Cartwright, et al., "Compatible Genericity with Run-Time Types for the Java Programming Language", Principles of Programming Languages, ACM, Oct. 1, 1998, pp. 201-215.
Joseph A. Bank, et al., "Parameterized Types and Java", May 1996, Retrieved from the Internet: URL: http://publications.csail.mit.edu/lcs/pubs/pdf/MIT-LCS-TM-553.pdf, pp. 1-19.
International Search Report and Written Opinion from PCT/US2015/026966, Date of Mailing Sep. 1, 2015, Oracle International Corporation, pp. 1-11.
Martin J. Cole, et al., "Dynamic compilation of C++ template code", Scientific Programming vol. 11, No. 4, Jan. 1, 2003, pp. 321-327.
Eyvind W. Axelsen, et al., "Groovy Package Templates", Proceeding of the 5th Symposium on Dynamic Languages, Oct. 26, 2009, pp. 15-26.
Lubomir Bourdev, et al., "Efficient run-time dispatching in generic programming with minimal code bloat", Science of Computer Programming, vol. 76, No. 4, Apr. 1, 2011, pp. 243-257.
Brian Goetz, "ClassDynamic Jun. 2014: Initial Draft", Retrieved from the Internet: URL: http://web.archive.org/web/20140801102025/http://cr.openjdk.java.net/briangoetz/valhalla/spec-classdyn.html, Jun. 2014, pp. 1-3.
"Design Pattern Instantiation Directed by Concretization and Specialization"—Peter Kajsa—ComSIS vol. 8, No. 1, Jan. 2011 (DOI:10.2298/CSIS091212032K), pp. 1-32.
International Search Report and Written Opinion from PCT/US2015/026965, Oracle International Corporation, dated Nov. 6, 2015, pp. 1-11.
Gamma E et al: "Design Patterns: Elements of Reusable Object-Oriented Software", Sep. 1, 1999, pp. 81-228, XP882287989, p. 175-p. 184.
Julian Dragos et al: "Compiling generics through user-directed type specialization", Proceedings of the 4th Workshop on the Implementation, Compilation, Optimization of Object-Oriented Languages and Programming Systems, ICOOOLPS '09, Jul. 6, 2009 (Jul. 6, 2009), pp. 42-47, XP055195664, New York, New York, USA DOI: 10.1145/1565824.1565830, ISBN: 978-1-60-558541-3, p. 43-p. 46.
Martin Buchi et al: "Generic Wrappers" In: "Advances in Communication Networking: 20th EUNICE/IFIP EG 6.2, 6.6 International Workshop, Rennes, France, Sep. 1-5, 2014, Revised Selected Papers", May 12, 2000 (May 12, 2000), Springer Verlag, DE 032548, XP055223226, ISSN: 0302-9743, ISBN: 978-3-642-36699-4, vol. 1850, pp. 201-225, DOI: 10.1007/3-540-45102-1 10, p. 202-p. 219.
Evered M et al: "Genja-a new proposal for parameterised types in Java", Technology of Object-Oriented Languages and Systems, 1997. Tools 25, Proceedings Melbourne, Vic., Australia Nov. 24-28, 1997, Los Alamitos, CA, USA,IEEE Comput. Soc, US, Nov. 24, 1997 (Nov. 24, 1997), pp. 181-193, XP010286322, ISBN: 978-0-8186-8485-2 p. 182-p. 188.
Gilad Bracha, "Generics in the Java Programming Language", Jul. 5, 2004, pp. 1-23.
Michael Johnson, "New Features of C#", CSCI 5448, 2012, p. 5.
Alessandra Warth, et al., "Statically Scoped Object Adaptation with Expanders", ACM OOPSLA'06, Oct. 22-26, 2006, pp. 1-19.
International Search Report and Written Opinion in PCT/US2015/026962, Date of Jul. 2, 2015, Oracle International corporation, pp. 1-12.
Andrew Myers, et al., "Parameterized Types for Java", Conference Record of POPL '97: 24th ACM SIGPLANSIGACT Symposium on Principles of Programming Language, Jan. 15-17, 1997, pp. 132-145.
Atanas Radenski, et al., "The Java 5 Gererics Comprise Orthogonality to Keep Compatibility", Journal of Systems & Software, Nov. 1, 2008, pp. 2069-2078, vol. 81, No. 11.
Brian Goetz, "State of the Specialization", Retrieved from the Internet: http://web.archive.org/web/20140717190322/http://cr.openjdk.java.net/briangoetz/valhalla/specialization.html, pp. 1-7.
"Templates, C++ FAQ", Jan. 15, 2014, Retrieved from the Internet: URL:http://web.archive.org/web/20140115082944/http://isoccp.org.wiki/faq/templates, pp. 2-27.
U.S. Appl. No. 14/660,177, filed Mar. 17, 2015, Brian Goetz et al.
U.S. Appl. No. 14/660,604, filed Mar. 17, 2015, Brian Goetz et al.
U.S. Appl. No. 14/692,590, filed Apr. 21, 2015, Brian Goetz et al.
U.S. Appl. No. 14/692,592, filed Apr. 21, 2015, Brian Goetz et al.
U.S. Appl. No. 14/692,593, filed Apr. 21, 2015, Brian Goetz et al.
U.S. Appl. No. 14/692,601, filed Apr. 21, 2015, Brian Goetz et al.
International Search Report and Written Opinion from PCT/US2015/026964, Date of mailing Jul. 1, 2015, Oracle International Corporation, pp. 1-11.

(56) References Cited

OTHER PUBLICATIONS

Nicolas Stucki, et al., "Bridging Islands of Specialized Code using Macros and Reified Types", Proceedings of the 4th Workshop on SCALA, Jan. 2013, pp. 1-4.

Nystrom et al., "Genericity through Constrained Types", 2009, IBM Watson Research Center, 18 pages.

Shailendra Chauhan, "Difference Between Generalization and Specialization", 2013, retrieved from http://www.dotnet-tricks.com/Tutorial/oops/169c211013-Difference-Between-Generalization-and-Specialization.html, 6 pages.

Kiezun et al., "Refactoring for Parameterizing Java Classes", IEEE, 2007, pp. 1-10.

Ernst, "Inheritance versus Parameterization", ACM, 2013, pp. 26-29.

"Common Language Infrastructure (CLI) Partitions I to VI," 6th Edition / Jun. 2012, ECMA International, Standard ECMA-335, pp. 1-574.

* cited by examiner

METADATA-DRIVEN DYNAMIC SPECIALIZATION

PRIORITY INFORMATION

This application claims benefit of priority to the following provisional application, which is hereby incorporated by reference in its entirety: Ser. No. 61/982,802 filed Apr. 22, 2014, titled Specializing Parametric Types with Primitive Type Arguments.

BACKGROUND

The present invention relates generally to software development and more specifically to various aspects of language development within any of various programming languages, such as a platform-independent, object-oriented programming language, as one example.

In various programming languages, parametric polymorphism (e.g., generics) may be considered as a way to make a language more expressive, while still maintaining full static type-safety. Parametric polymorphism may allow a function or a data type to be written in a generic fashion such that it can handle various data types in the same manner regardless of their different types. Such functions and data types may be called generic functions and generic datatypes. For example, a generic list class may be written List<T>, which means that it can be a list of elements of any type T, where T is specified separately from the specification of List.

Traditionally, when using a platform-independent, object oriented language, one cannot generify over primitive types without boxing (e.g., automatically converting a value of a primitive type like int into an object of a corresponding wrapper class like Integer).

Parametric polymorphism (generics) may also involve a tradeoff between code size, generation costs and type specificity. For example, a programming language may support primitive-specialized generics, but may generates specialized classes statically, thereby at potentially increased cost to code footprint and compilation cost. Another programming language may generate a specialized instantiation of templates for each instantiation used by the program, which may result in a large static footprint. Yet a third language may use a templatized bytecode format, only pushing performing specialization to runtime, which may require an additional step before using a generic class file, thereby potentially harming runtime performance.

SUMMARY

Metadata-driven dynamic specialization, such as may be applied to a platform independent object-oriented programming language, may include generating an annotated class file usable directly as a class file and that may also be a template usable for specialization. A type erasure operation may be applied using an encoded (or annotated) form of a program element in a generic class. The program element may represent a class signature or declaration, a method signature or declaration, an instruction, an argument to an instruction, as well as virtually any program element that represents, moves, or manipulates data.

The encoded form of the program element may include metadata indicating which type variables of the class (or method) declaration have been erased and which types are the erasures of type variables. Additionally, the metadata may include various types of specialization-related information. For example, the metadata may indicate that an instruction operates on values of the type variables of a class (or method declaration). Similarly, the metadata may indicate that an argument indicates types that are erasures of the type variables of the class or method declaration.

Furthermore, the annotated class file may be usable directly (e.g., to load the class) and as a template for performing specialization of the class (or other elements within the class file). In other words, the metadata in the encoded form may not prevent the instruction and/or argument from being used directly.

DETAILED DESCRIPTION OF EMBODIMENTS

Figure 1:
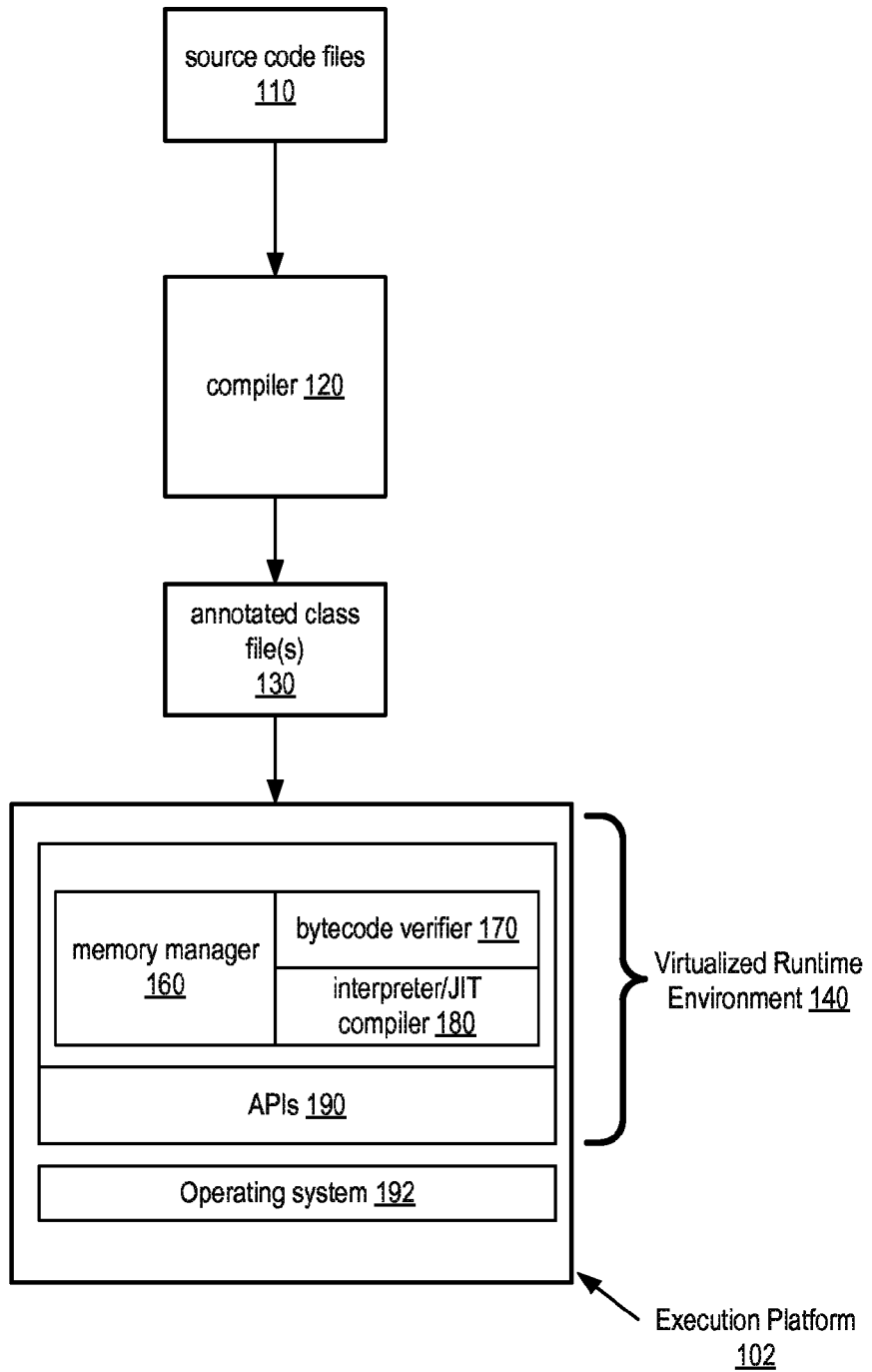
FIG. 1 is a logical block diagram illustrating component of a system implementing metadata-driven dynamic specialization, according to one embodiment.

Described herein are various embodiments of enhancements to software development using a platform-independent, object oriented language, such as the Java™ programming language, to support various features, such as (for example) metadata-driven dynamic specialization. Metadata-driven dynamic specialization may include generating an annotated class file that may be used in multiple ways, according to different embodiments. For example, an annotated class file may be usable directly as a class file, but may also be used as a template during specialization. A compiler may include type erasure information as specialization information in an annotated class file. For instance, one or more program elements that may need to be adjusted during specialization may be marked (e.g., annotated, decorated, etc.) to create encoded forms of the program elements. Thus, a type erasure operation may be applied using an encoded form of a program element in a generic class.

The metadata in an annotated class file may include specialization information indicating which type variables have been erased and which types are the erasures of type variables, according to some embodiments. Type erasure pertains to the use of generics within a programming language (e.g., the Java language). When performing a type erasure operation, a compiler may be configured to replace all type parameters in generics types with their bounds or with an Object type if the type parameters are unbounded. The generated bytecode may thus contain only ordinary classes, interfaces and methods. Additionally, a compiler performing a type erasure operation may preserve type safety, such as by inserting type casts if necessary and may generate bridge methods to preserve polymorphism in extended generic types. Thus, in some embodiments, erasure may be thought of as performing type checking at compile time while executing on a more weakly-typed system, such as for use with an efficient, but weakly-typed, execution system.

Additionally, type erasure may be used for situations other than with generics. For instance, a runtime system may not include a full set of separate bytecodes for all types. Instead, some types may be encoded using a corresponding bytecode for a compatible type (possibly after the compiler verifies the type-system properties of operations for those types). For example, a runtime system may not include a full set of separate bytecodes for short, byte and/or boolean, but may instead use the corresponding bytecodes for int after verifying the type-system properties of operations on shorts, or bytes and/or booleans.

Furthermore, the metadata in the annotated class file may not prevent the annotated class file from being used directly (e.g., used to load the class directly). Thus, as described herein according to various embodiments, a generic type parameter may be allowed to range over the unbounded set of virtually all types (e.g., or over a bounded set of types which includes at least one type which is not a reference, such as int).

Thus, metadata-driven dynamic specialization may allow class files to do double-duty as directly usable classes (e.g., when instantiated with reference types—promoting fast class loading and sharing) and on-demand specialization when instantiated with primitive types, while at the same time minimizing the runtime work of specialization by pre-computing specialization transforms and storing them as metadata in the class file.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Turning now to FIG. 1 which illustrates a workflow for compiling and executing a computer program specified in a high-level, platform independent, object-oriented language that supports primitive and reference data types, and various methods, features and enhancements regarding metadata-driven dynamic specialization as described herein, according to various embodiments. For purposes of illustration, the following description is provided largely in the context of using the Java™ programming language. However, it is noted that the techniques described may be used with virtually any object-oriented programming language that supports multiple kinds of types (such as primitive types, reference types, record types, union types, etc.) and specialization thereof in appropriate contexts.

According to the illustrated embodiment, the workflow may begin when a compiler, such as compiler 120, may be implemented on one or more computing devices and may receive source code for a computer program, such as source code 110. In various embodiments, source code 110 may be specified in various high-level and/or platform independent, object-oriented programming languages, such as Java™ and/or other languages. For example, source code may be provided as a set of .java files in embodiments where Java™ is being used. In some embodiments, source code 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™. In general, a class may be considered a user-defined type or data structure that may include data, variables, functions, methods and/or other attributes as members and that represents a definition, blueprint, or template, for creating programming objects of a specific type. A class may provide initial values for data members and implementations for member functions and methods. Classes are frequently included in libraries. A library may be considered a collection of resources used by software programs or applications. A library may include any of various types of resources including, but not limited to, data, documentation, classes, subroutines, and/or type specifications, according to some embodiments. A library may be organized so as to be utilized by more than one application (possibly at the same time), and may promote re-usability by providing resources so that applications may not have to implement (or re-implement) the same behavior.

The compiler 120 may analyze the source code 110 to produce an executable version of the program or bytecode files, such as annotated class file(s) 130 (e.g., .class files or .jar files in the case of Java™) in the depicted embodiment. Different types of executable code formats may be used in various embodiments; for example, binary machine language may be used instead of bytecodes. In some scenarios, parts of the executable code (e.g., annotated class files 130) may be in bytecode while others are in a native binary machine language.

As part of compiling program source code 110 into executable code (e.g., annotated class files 130), the compiler 120 may perform a sequence of analysis operations and generate various intermediate data structures before generating the executable version, such as to apply or implement metadata-driven dynamic specialization, according to some embodiments. For example, the compiler may apply a type erasure operation using an encoded (annotated or decorated) form of a program element in a generic class, thus created annotated class file 130. As noted above, the encoded form of the program element may include metadata indicating which type variables of the class (or method) declaration have been erased and which types are the erasures of type variables.

Additionally, the metadata may include various types of specialization-related information. For instance, in some embodiments metadata-driven dynamic specialization may involve the specialization of various elements including, but not limited to, method interfaces, class interfaces, data descriptions (e.g., data fields), and/or machine instructions (e.g., bytecodes). Thus, in one example the metadata may indicate that an instruction operates on values of type variables, values of reference types, and/or class or method declarations. Similarly, the metadata may indicate that an argument indicates types that are erasures of the type variables of the class or method declaration. Additionally, the metadata may indicate that one or more types are the erasure of parameterized types that use type variables of the class declaration as type arguments. Thus, metadata (e.g., the encoded form) may indicate any of various types of specialization-related information, according to different embodiments.

In some embodiments, a compiler, such as compiler 120, that is configured to implement metadata-driven dynamic specialization may retain certain types of information that traditionally may not have been retained during the compilation process. For example, in one embodiment, compiler 120 may retain information utilized as part of performing an erasure. The compiler may include (at least part of) such information in the annotated class file 130 as metadata regarding specialization.

As illustrated in FIG. 1, annotated class file 130 may be passed to an execution environment, such as virtualized runtime environment 140, which executes the code on an execution platform 102, thereby creating various output data and/or behavior. The virtualized runtime environment 140 may in turn comprise a number of different components, such as a memory manager 160, a bytecode verifier 170 (e.g., to check the validity of the executable code), and/or an interpreter and/or a just-in-time (JIT) compiler 180, according to various embodiments. The JIT compiler may in some embodiments be responsible for translating some or all of the bytecode (for example, heavily-used portions of bytecode) into platform-specific machine code to improve performance of the program execution. A virtualized runtime environment 140 may also include code to implement a number of application programming interface (API) libraries 190 in some embodiments. The virtualized runtime environment 140 may run on top of lower-level software such as an operating system 192 in some embodiments.

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

In some embodiments, virtualized runtime environment 140 may implement metadata-driven dynamic specialization using the annotated class file(s) 130 generated by compiler 120. According to some embodiments, virtualized runtime environment 140 implementing metadata-driven dynamic specialization may, when loading a class to be specialized with a particular parameterization, use annotated class file 130 as a template (along with the parameters with which to specialize) and may produce a new class which is the particular specialization of the class being specialized. For example, when specializing a class, a set of type parameters may be part of the input to the specialization (e.g., List<any T> may be specialized using T=int as a parameter to obtain List<int>). In general, an annotated class file 130 may be considered a class file marked up with specialization related metadata. Furthermore, an annotated class file 130 may be turned into a new class that is a specialization of the annotated class, according to various embodiments.

Figure 2:
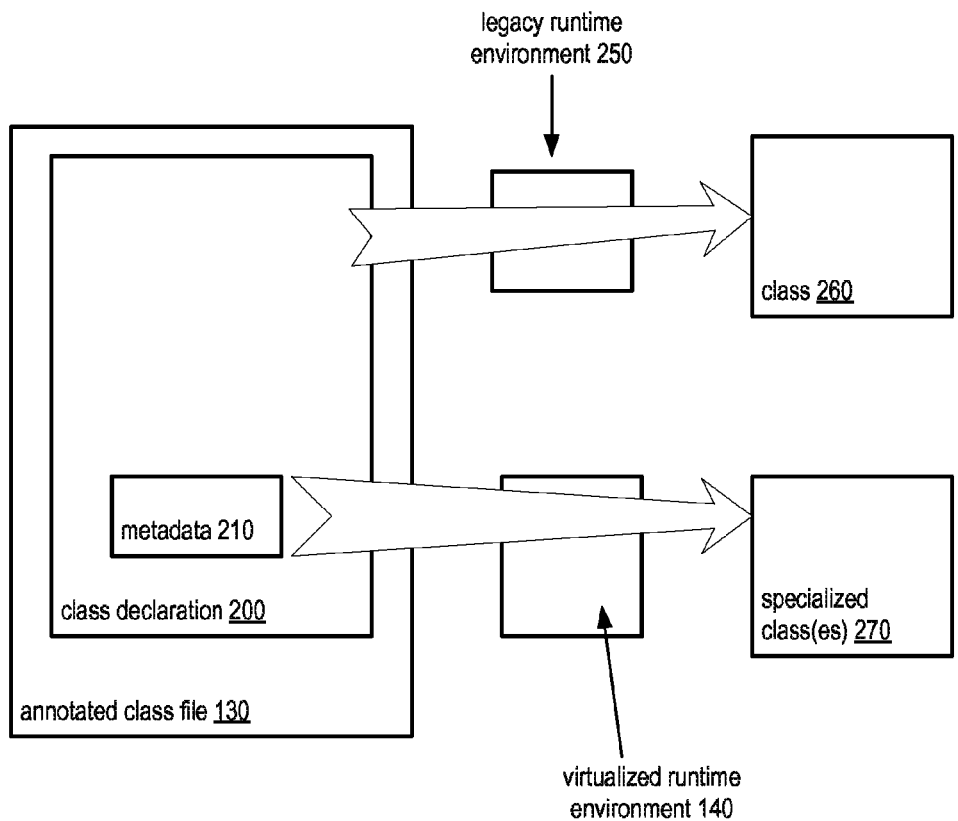
FIG. 2 is a logical block diagram illustrating use of an annotated class file according to metadata-driven dynamic specialization, as in one embodiment.

As noted above, the annotated class file may be usable directly (e.g., to load the class in situations where its type variables are erased) and as a template for performing specialization of the class (or other elements within the class file). FIG. 2 is a logical block diagram illustrating use of an annotated class file according to metadata-driven dynamic specialization, as in one embodiment. In some embodiments, annotated class file 130 may include a single artifact, such as class declaration 200, that may be used as an executable class (e.g., a class that can be loaded and used as is) but that may also be suitably annotated, such as by including metadata 210, so that it can be used as a template to generate specialized versions of that class. Similarly, a method declaration in a class file may also be annotated such that it may be used directly and/or used as a template to generate specialized versions of the method declaration.

In some embodiments, an annotated class file 130 may be usable by legacy virtualized runtime environments (e.g., ones that do not utilize metadata-driven dynamic specialization as described herein) as well as by virtualized runtime environment that utilize metadata-driven dynamic specialization as described herein. As illustrated in FIG. 2, an annotated class file 130 may include an encoded form of a program element, such as annotated class declaration 200. Class declaration 200 may include metadata 210 usable by virtualized runtime environment 140 to generate one or more specialized class(es) 270, according to one embodiment.

Additionally, annotated class file 130 and class declaration 200 (including metadata 210) may also be directly usable (e.g., loadable) by legacy runtime environment 250 (e.g., a runtime environment not configured to implement metadata-driven dynamic specialization), to load class 260, according to some embodiments. For example, annotated class file 130 and/or class declaration 200 may include metadata 210 structured such that legacy runtime environment 250 may not recognize, and thus may be able to ignore, the annotations (e.g., the metadata 210), but legacy runtime environment 250 may be able to use the class file in traditional manner (e.g., not utilizing metadata-driven dynamic specialization) to load class 260 from class declaration 200.

For example, a class file annotated according to metadata-driven dynamic specialization may include an annotated aload instruction. A legacy virtualized runtime environment may identify the annotated aload as a traditional aload instruction and execute it in the normal fashion. However a virtualized runtime environment configured to utilize metadata-driven dynamic specialization may recognize and utilize the annotated instruction to perform specialization. For example, in one embodiment, virtualized runtime environment 140 may recognize an annotated aload instruction and perform a particular type specialization by replacing the aload instruction with another instruction more appropriate for the particular type specialization.

Thus, in some embodiments, instead of generating only a template that may not be directly usable as a class file (e.g., is executable as) or generating a number of classes ahead of time (e.g., one for each instantiation), a single class file may be generated that is directly usable, but that may also be marked up (e.g., annotated) with extra information allowing it to be used as a template to generate specializations (e.g., at runtime).

Figure 3:
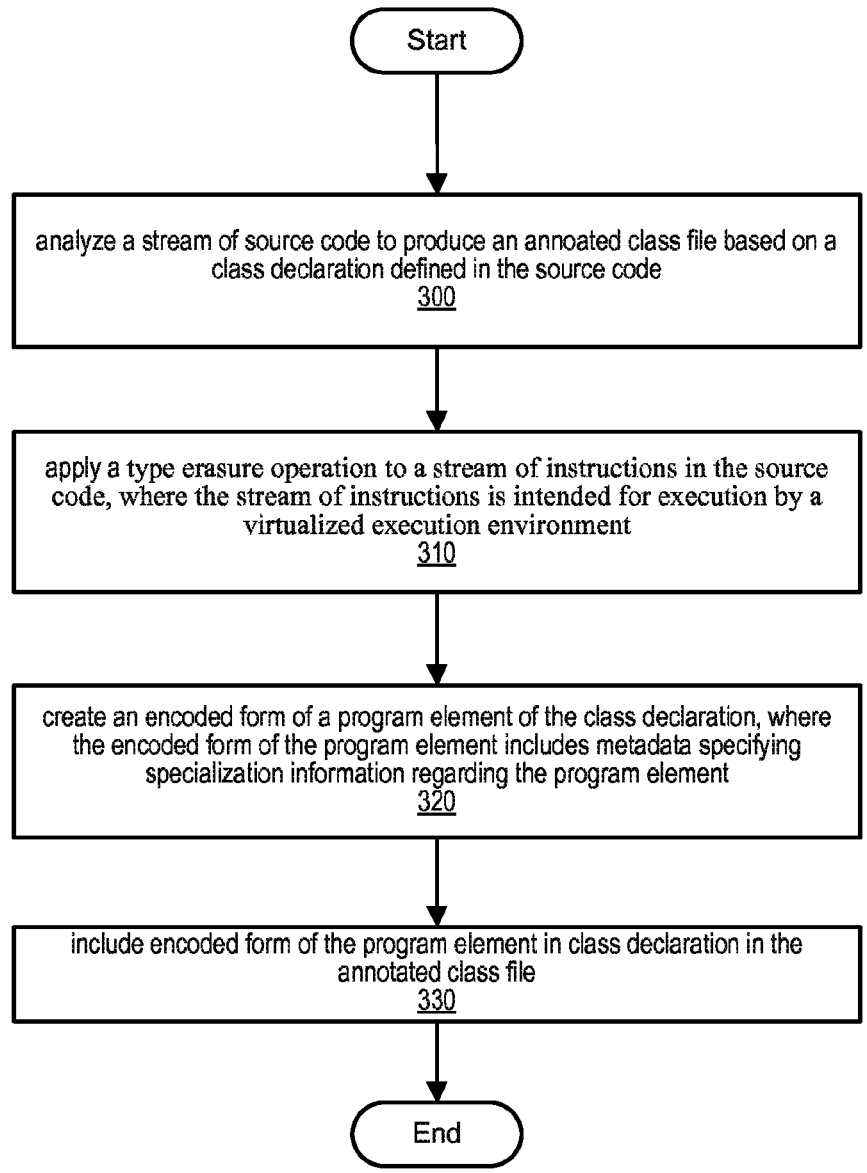
FIG. 3 is a flowchart illustrating one embodiment of a method for generating an annotated class file as part of metadata-driven dynamic specialization.

FIG. 3 is a flowchart illustrating one embodiment of a method for generating an annotated class file as part of metadata-driven dynamic specialization, according to one embodiment. As illustrated by block 300, a compiler, such as compiler 120, may analyze a stream of source code to produce an annotated class file based on a class declaration defined in the source code, according to one embodiment. For example, compiler 120 may analyze source code 110 to generate annotated class file(s) 130, according to one embodiment. While FIG. 2 describes metadata-driven dynamic specialization in regard to a class declaration, as noted above metadata-driven dynamic specialization may be used with various other types of program elements, such as method declarations, instructions, arguments, and virtually any program element that moves or manipulates data and/or data types.

Additionally, compiler 120 may apply a type erasure operation to a stream of instructions in the source code where the stream of instructions is intended for execution by a virtualized execution environment, as illustrated by block 310. For example, in one embodiment, source code 110 may include a class definition that may need to be specialized according to a particular type parameterization. Additionally, compiler 120 may create an encoded (e.g., annotated) form of a program element of the class declaration, where the encoded form of the program element includes metadata specifying specialization information regarding the program element, as shown in block 320. Thus, in some embodiments, typed bytecode instructions may be specialized based on metadata, such as by marking (e.g., annotating) some bytecodes as being derived from the erasure of a particular type variable T, so that on specialization, they can become specialized via a mechanical and verifiable transformation. For example, some typed bytecode instructions may be specialized based on metadata marking "aload" bytecodes as "I am aload because I am derived from the erasure of type variable T", so that on specialization, they may become iload bytecodes (as one example) via a mechanical and verifiable transformation. In some embodiments, the specialization information may be, or may be considered, the result of capturing otherwise-erased, compile-time type information that may be used to reconstruct types at runtime.

Figure 4:
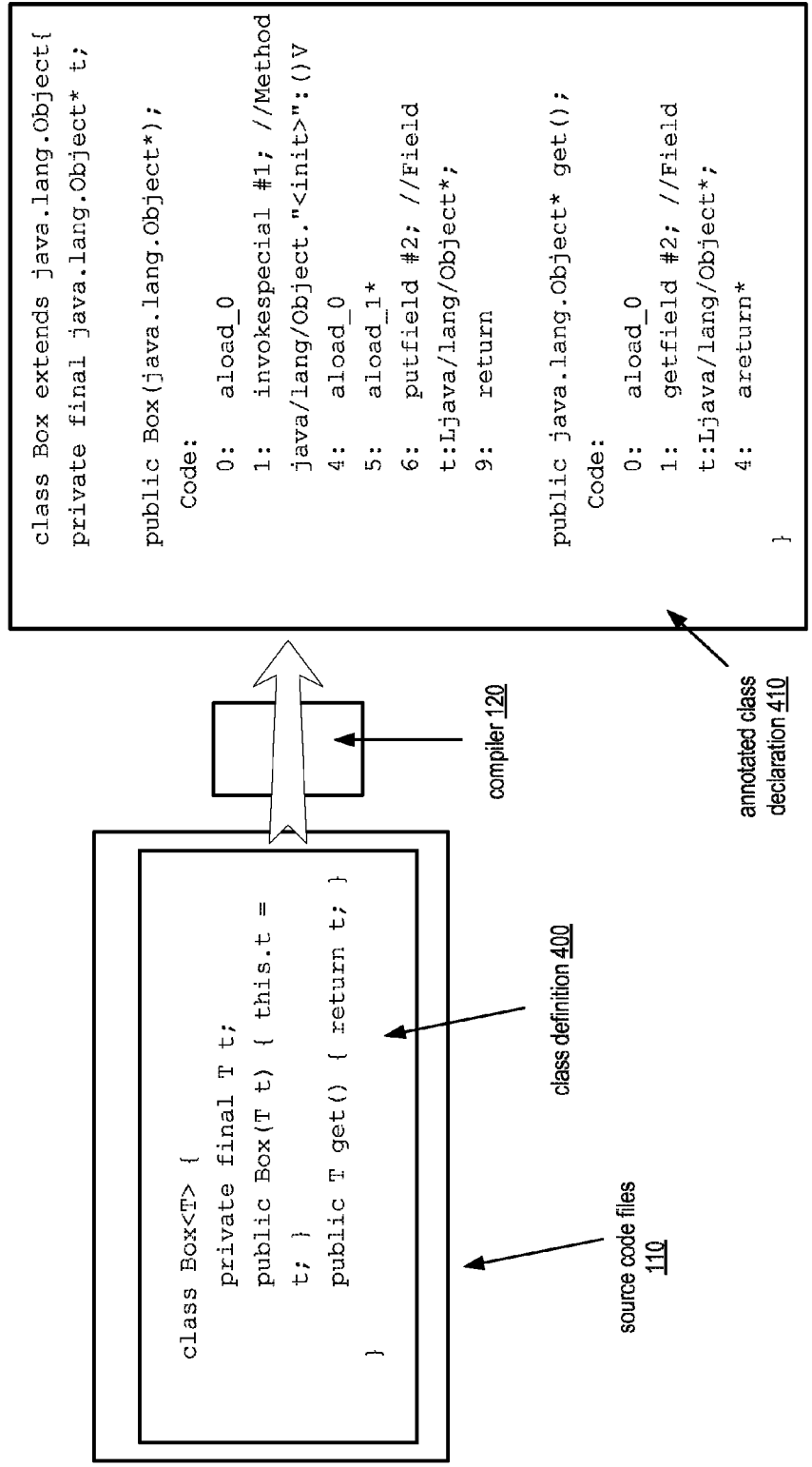
FIG. 4 is a logical block diagram illustrating an example of generating an annotated class file as part of metadata-driven dynamic specialization, according to one embodiment.

For instance, FIG. 4 is a logical block diagram illustrating a type erasure operation applied to a stream of instructions, according to one embodiment. As shown in FIG. 4, compiler 120 may analyze source code 110 and may apply a type erasure on one or more program elements, such as class definition 400 or one or more elements of class definition 400.

Metadata-driven dynamic specialization of generic classes may involve metadata-driven dynamic specialization of member signatures. In turn, metadata-driven dynamic specialization of member signatures may involve marking (e.g., annotating or created an encoded from of) some occurrences of references types in method/field signatures as being the erasure of type variable T, so that on specialization, they can become I, according to some embodiments. In some embodiments, uses of erased types in member signatures or other type uses (e.g., supertypes, casts, instanceof) may be annotated as being derived from the erasure of some type variable T, so that on specialization, they can be substituted with a proper description of a specialized type, while at the same time minimizing the runtime work of specialization by pre-computing specialization transforms and storing them as part of the metadata in the annotated class file 130.

For instance, compiler 120 may apply a type erasure operation on class definition 400. As shown in FIG. 4, class definition 400 may include the following example Box class, according to one example embodiment:

```
class Box<T> {
    private final T t;
    public Box(T t) { this.t = t; }
    public T get( ) { return t; }
}
```

Compiling this class with a traditional compiler (e.g., one not configured to implement metadata-driven dynamic specialization) may yield the following bytecode:

```
class Box extends java.lang.Object{
private final java.lang.Object t;
public Box(java.lang.Object);
   Code:
     0:   aload_0
     1:   invokespecial #1; //Method
   java/lang/Object."<init>":( )V
     4:   aload_0
     5:   aload_1
     6:   putfield #2; //Field t:Ljava/lang/Object;
     9:   return
public java.lang.Object get( );
   Code:
     0:   aload_0
     1:   getfield #2; //Field t:Ljava/lang/Object;
```

```
    4:  areturn
}
```

Numerous approaches may be taken to represent the needed generic information in the bytecode, according to various embodiments. For example, in one embodiment a fully generic representation at the bytecode level may be used. In another embodiment, types and bytecodes may be tagged (e.g., marked or annotated) to indicate whether that type or bytecode is directly related to a type that was present in the source file, or the erasure of some type variable. In some embodiments, specialization using metadata-driven dynamic specialization, may be considered and mechanical (e.g., automatic and/or straight-forward), without any additional dataflow analysis or typechecking at runtime beyond bytecode verification. Thus, in some embodiments, the result of specialization may be verifiable using existing verification rules. Accordingly, conversion information may be included in the metadata of the annotated class file, which in turn may simplify the complexity of components performing specialization. Thus, in some embodiments, the resulting bytecode may be verified as normal (e.g., with legacy verifier processes).

Compiler 120 may specialize the preceding example Box class with T=int, as one example illustration of applying a type erasure operation, as described above regarding blocks 310 and 320 of FIG. 3. Thus, in the above example bytecode (e.g., the compiled version of class Box), some occurrences of Object may really mean Object, but some may mean erasure(T). According to some embodiments, if this class were to be specialized for T=int, the signature of get ( ) may return int.

Annotated class declaration 410 in FIG. 4 (and in the following listing) shows the same bytecode marked up to preserve erasure information, according to some embodiments of metadata-driven dynamic specialization. In some embodiments, a class file may be annotated with metadata that may include one or more characters or symbols (e.g., an asterisk) indicating signatures, instructions, references, types, etc., that may need to be adjusted during specialization. As shown in annotated class declaration 410, a '*' next to a type name or bytecode may indicate that the type in the class file is derived from the erasure of T and therefore may be adjusted during specialization, according to some embodiments. This example representation is specific to a single type variable and is solely for illustration purposes.

```
class Box extends java.lang.Object{
private final java.lang.Object* t;
public Box(java.lang.Object*);
    Code:
       0:  aload_0
       1:  invokespecial #1; //Method
            java/lang/Object."<init>":( )V
       4:  aload_0
       5:  aload_1*
       6:  putfield #2; //Field t:Ljava/lang/Object*;
       9:  return
public java.lang.Object* get( );
    Code:
       0:  aload_0
       1:  getfield #2; //Field t:Ljava/lang/Object*;
       4:  areturn*
}
```

Thus, as shown in annotated class declaration 410, various program elements, such as bytecode instruction aload_1, as well as data type declaration java.lang.Object may be annotated with "*" to indicate that they are derived from the erasure of T and therefore may be adjusted during specialization, according to some embodiments.

While the examples above include annotations utilize an asterisk, other forms of annotation may be used in other embodiments. For example, in other embodiments, other symbols and/or characters may be used to indicate various types of specialization information within an annotated class file. Additionally, in yet other embodiments, metadata indicating specialization information may be included in separate, specific structures within the class file. For instance, in one embodiment, an annotated class file may include one or more data structures listing or otherwise indicating which program elements may need to be adjusted during specialization.

For example, annotated class declaration 410 may include metadata indicating an annotated aload_1 instruction. A legacy virtualized runtime environment may identify the annotated aload as a traditional aload instruction and simply use an aload. However virtualized runtime environment 140 may recognize and utilize the annotated instruction to perform specialization. Thus, in one embodiment, virtualized runtime environment 140 may perform a particular type specialization by replacing the aload/instruction with another instruction more appropriate for the particular type specialization.

The example discussed above includes only a simplified set of program elements to be specialized and hence being annotated. In other embodiments, however, more and/or different program elements may need to be transformed during specialization and therefore may be annotated by compiler 120. In addition to "typed" bytes of which the aload instruction above is one example (other examples include areturn and aastore), other bytecodes (such as dup) may also be annotated. In general, any bytecode that takes a "class" operand (e.g., new, checkcast, load-class-literal, getfield, putfield, invoke, etc.) may also be annotated by compiler 120, according to various embodiments.

For instance, continuing the Box class example, any instruction that performs:
getfield Box, "t"
may need to be adjusted when T is specialized to int, (e.g., because the name of the class for Box<int> may be different from the name of the class for erased Box). Thus, in some embodiments, any instruction that refers to a type by name may need to have that operand adjusted during specialization if specialization could cause that name to change and hence that instruction (and/or the operand) may be annotated.

Additionally, in some embodiments, some bytecodes may be annotated to include multiple types of specialization information. For example, the metadata associated with a particular annotated bytecode may specify both the class involved (e.g., a receiver for a method call, a hosting class for a field operation, etc.) as well as the type of data being manipulated (e.g., the type of the field, the return type of a method invocation, etc.).

Returning now to FIG. 3, compiler 120 may also include the encoded for of the program element in the class declaration in the annotated class file, as illustrated by block 330. As noted above, the annotated class file may be usable directly (e.g., to load the class) and as a template for performing specialization of the class (or other elements within the class file). As noted above, in some embodiments, a compiler configured to implement metadata-driven dynamic specialization, such as compiler 120, may retain certain types of information that traditionally may not have been retained during the compiling process. For example, compiler 120 may retain information utilized as part of performing an erasure operation and include such information in annotated class file 130 as metadata 210 specifying various types of specialization information.

In some embodiments, the metadata may be utilized in more than one manner. For example, the metadata may be used to specialize signatures of class members (e.g., class or method signatures). Additionally, the metadata may be used to specialize the byte code itself (e.g., to specialize individual byte codes or opcodes). For instance, the byte codes generated for a particular virtualized runtime environment may be strongly typed and therefore different instructions may need to be used based on the type (e.g., the specialized type) being manipulated (e.g., a different instruction may be used to move or copy an integer than may be used to move or copy an object).

Thus, the metadata used to annotate a class file may include information about what data type is expected for a particular instruction and when that instruction is specialized for a particular type, some instructions (e.g., byte codes) may have to be adjusted (e.g., changed) in order to use an appropriate instruction for the particular (e.g., specialized) type being manipulated. For example, an instruction that expect to manipulate (e.g., move, copy, etc.) an object may be adjusted (e.g., changed to a different version of that instruction) in order to properly handle a different (specialized) type (e.g., an int, double, float, etc.).

In some embodiments, metadata driven dynamic specialization may be considered a way to utilize generics such that one class file may be generated, but which may be dynamically specialized at runtime. For instance, the class file may be used (or interpreted) directly with no transformation, but may also be used as a template for specialization at runtime. In order to allow the annotated class file generated as part of metadata-driven dynamic specialization to be used directly, the class file may be generated using type erasure for the most common type information. However, the class file may be annotated with additional information that allows for type specialization at runtime.

In some embodiments, the most common interpretation(s) may be pre-instantiated—thus potentially avoiding an extra translation step at runtime (e.g., for the most common interpretation). For example, in one embodiment, ArrayList<int> and ArrayList<long> may be pre-instantiated for ArrayList.

As noted above, within an annotated class file 130, one or more program elements (e.g., class and/or method signatures) may include metadata 210 that describes how to modify the program element for specialization, according to various embodiments. In other words, the metadata 210 may include information describing which portions of the program element (e.g., which instructions, declaration, arguments, etc.) may have to be adjusted during specialization. For example, a class file may include a class signature that, by default, defines a list of objects, but that may be annotated to include metadata identifying one or more portions (e.g., instructions, references, etc.) that may have to be adjusted when specializing the class signature to define a list of floats (as one example).

In some embodiments, an annotated class file may be usable by legacy virtualized runtime environments (e.g., ones that do not utilize metadata-driven dynamic specialization as described herein) as well as by virtualized runtime environment that utilize metadata-driven dynamic specialization as described herein. For example, the annotated class file may include metadata structured such that a legacy virtualized runtime environment may be able to ignore the annotations (e.g., the metadata) that it does not recognize, but the legacy virtualized runtime environment may be able to use the class file in traditional manner (e.g., not utilizing metadata-driven dynamic specialization).

For example, a class file annotated according to metadata-driven dynamic specialization may include an annotated aload instruction. A legacy virtualized runtime environment may identify the annotated aload as a traditional aload instruction and simply use an aload. However a virtualized runtime environment configured to utilize metadata-driven dynamic specialization may recognize and utilize the annotated instruction to perform specialization. For example, in one embodiment, virtualized runtime environment 140 may recognize an annotated aload instruction and perform a particular type specialization by replacing the aload instruction with another instruction more appropriate for the particular type specialization.

While described herein mainly regarding class signatures and instructions, metadata-driven dynamic specialization may also be applied to method signatures, class signatures and/or data signatures, according to some embodiments.

For example, if given the following class definition:
class ArrayList<T> implements ListOf<T>
If T is specialized with int, that specialization may also have to be propagated to the super class, thus resulting in the following class signature:
class ArrayList<int> extends ListOf<int>
Similarly, if a method returned T, it may be re-written to return int, and a field that is of type ArrayList<T> may be re-written to be of type ArrayList<int>, according to some embodiments. Thus, virtually anything that may be considered to have a type or to be associated with (e.g., that may reference, move, manipulate, etc.) a type (e.g., local variables, stack values, etc.) may be annotated in a class file and adjusted upon specialization.

In general, metadata-driven dynamic specialization may be applied to virtually anything that carries type information (e.g., code, signatures, side tables used by debugging, profilers, garbage collection, etc.), according to various embodiments. For example, different execution environments may require different data their respective input formats, but metadata-driven dynamic specialization may apply to all the components of the particular class file that an execution environment requires. Two specific examples of class file components to which metadata-driven dynamic specialization apply may be signatures, and typed instructions. However, in some embodiments, the same specialization process may be applied to other things, such as stack map tables used for verification or type tables used for debugging, etc.

Figure 5:
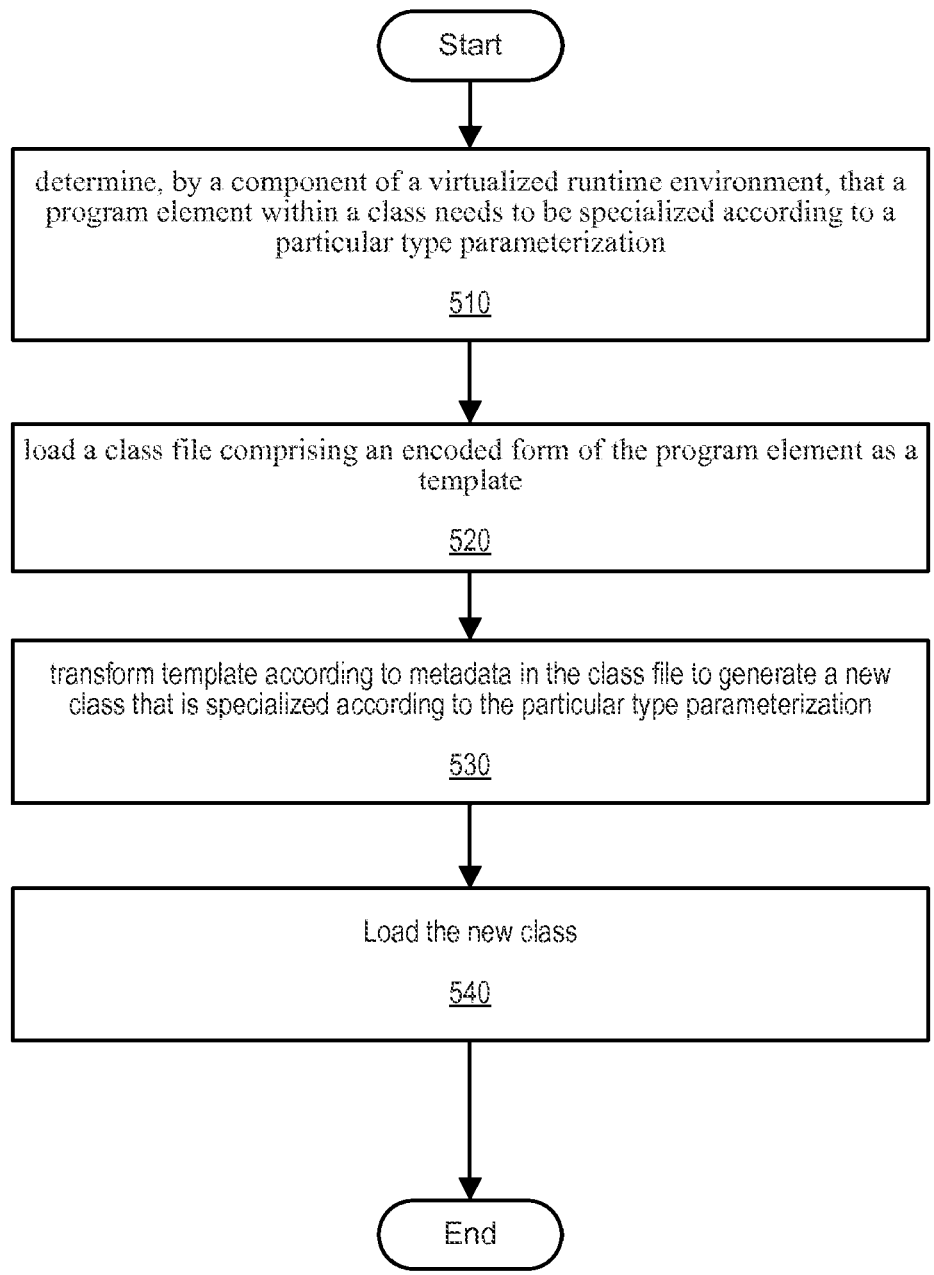
FIG. 5 is a flowchart illustrating one embodiment of a method for specialization using metadata-driven dynamic specialization.

FIG. 5 is a flowchart illustrating one embodiment of a method for specialization using metadata-driven dynamic specialization. Aspects of the method illustrated in FIG. 5 may be discussed using an example illustrated by FIG. 6, which is a logical block diagram illustrating an example of specialization using an annotated class file according to metadata-driven dynamic specialization, as in one embodiment.

As shown in FIG. 5, a virtualized runtime environment may (e.g., at runtime) determine that a program element within a class needs to be specialized according to a particular type parameterization, as shown in block 510. The virtualized runtime environment may then load a class file comprising an encoded (e.g., annotated) form of the program element as a template, as in block 520 and then transform the template according to metadata in the class file to generate a new class that is specialized according to the particular type parameterization, as in block 530, according to some embodiments. When loading a class to be specialized with a particular parameterization virtualized runtime environment 140 may use the annotated class file as a template along with various parameters with which to specialize to produce a new class which is the particular specialization of that class. Thus, an annotated class file (e.g., a class marked up with specialization related metadata) may be turned into a new class that is a specialization of the annotated class, according to some embodiments.

Figure 6:
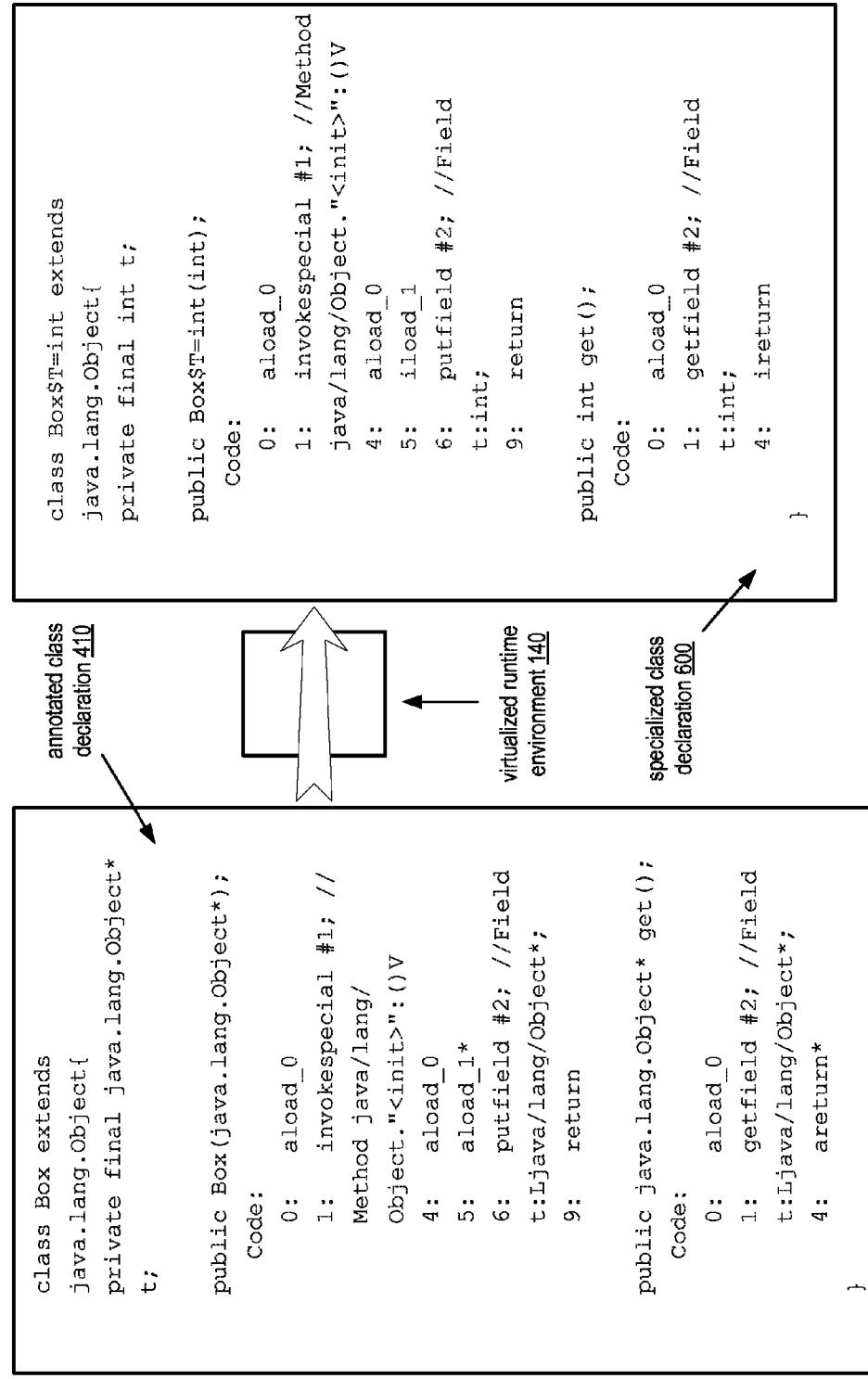
FIG. 6 is a logical block diagram illustrating an example of specialization using an annotated class file according to metadata-driven dynamic specialization, as in one embodiment.

For example, as shown in FIG. 6, virtualized runtime environment 140 may be configured to determine that an instance of the class Box needs to be specialized according to particular type parameterization, such as with int. According to one embodiment, when specializing for T=int, instances of Object may be replaced with int, and a bytecodes replaced with corresponding i ones. Similarly, some of the "aload" bytecodes may become "iload" bytecodes.

Thus, as one example, virtualized runtime environment 140 may specialize annotated class declaration 410 resulting in a new class, illustrating by specialized class declaration 600, shown in FIG. 6 and below:

```
class Box$T=int extends java.lang.Object{
private final int t;
public Box$T=int(int);
  Code:
    0:   aload_0
    1:   invokespecial #1; //Method
    java/lang/Object."<init>":( )V
    4:   aload_0
    5:   iload_1
    6:   putfield #2; //Field t:int;
    9:   return
public int get( );
  Code:
    0:   aload_0
    1:   getfield #2; //Field t:int;
    4:   ireturn
}
```

Thus, the annotated aload_1 instruction from annotated class declaration 410 may be transformed to an iload_1 instruction, since in this example, the Box class is being specialized for int.

Returning now to FIG. 5, after transforming the template according to the metadata to generate the new specialized class, virtualized runtime environment 140 may then load the new class for use, as in block 540.

Additionally, if no specialization is needed the annotated class file may also be used as is. Furthermore, according to some embodiments, the annotated class (e.g., the template class) may verify (e.g., according to a programmatic verifier, such as bytecode verifier 170, that may be part of a virtualized runtime environment 140) as an erase class. Additionally, the resulting specialization may also verify correctly. In other words, in some embodiments, metadata-driven dynamic specialization may not involve any change to the way in which a verifier works. Additionally, since the specialization transformation may be mechanical, in some embodiments it may be possible to eliminate verifying the result of the specialization transformation, such as by verifying the transformation algorithm rather than the individual specialization transformations, thereby potentially reducing the runtime cost of specialization.

While described above regarding implementing metadata-driven dynamic specialization at runtime, in some embodiments, one or more of the steps described above regarding FIG. 5 may be performed prior to runtime. For example, in one embodiment, the class (or other signature) may be specialized at build time and simply loaded at runtime, as described above. Furthermore, some classes may be specialized at build time while others may be specialized at runtime, according to different embodiments.

The approach illustrated above, and described herein, may be directed towards the existing erased generics. The bytecode for Box.class may already be erased and suitable for direct use with reference instantiations. According to some embodiments, metadata may be added that enables it to also be used as a template for runtime specialization of primitive instantiations.

As shown in the above example, reference-specific bytecodes to be adapted from "areturn" to their int-specific counterparts, such as "ireturn" (or other primitive or value types) may also be marked. Similarly, in some embodiments, components of field or method signatures that need to be adapted may also be marked. Additionally, attributes that point into the code attribute to identify which bytecodes may be adjusted for each specializable type variable, and attributes that annotate which components of field or method signatures in the constant pool similarly may be adjusted. This may, in some embodiments, take the form of new classfile attributes and/or new constant pool types.

The approach described herein represents merely one of many possible choices and that other manners of annotation may be used in other embodiments. As noted above, while the examples herein use a "*" symbol to represent the metadata used to communicate information regarding specialization of primitive instantiations, different symbols and/or mechanisms may also be used for the same purpose, according to various embodiments.

According to various embodiments, specialization may be considered a component of the compiling/execution tool chain. In other words, systems that implement metadata-driven dynamic specialization may have latitude to perform specialization either on demand at runtime (e.g., if the virtualized runtime environment is willing/able to do so), or ahead of time (e.g., prior to runtime). Thus, in some embodiments, metadata-driven dynamic specialization may be implemented so as to instantiate (and/or specialize) at runtime only classes (or methods, references, etc.) being used. In other embodiments however, metadata-driven dynamic specialization may be implemented so as to generate multiple possible specializations at build time (e.g., prior to runtime), according to some embodiments.

Thus, metadata-driven dynamic specialization may involve the ability to specialize and/or instantiate as few or as many classes/methods as desired at build-time (e.g., prior to runtime) and to dynamically specialize and/or instantiate any additional classes/methods as required at runtime, according to various embodiments. In other words, metadata-driven dynamic specialization may provide flexibility to determine and take advantage of various tradeoffs, such as between application start up time (e.g., specialization/instantiation prior to runtime) and footprint size (e.g., specialization/instantiation at runtime).

The flexibility to delay specialization as late as runtime or as early as build time (e.g., based on various engineering concerns)—while still using the same format and the same process (e.g., the same specialization transformations)—may be considered a feature of metadata-driven dynamic specialization, according to some embodiments.

Whether to specialize a class (or other signature) at build time or runtime may be determined based on various criteria, according to various embodiments. For example in one embodiment, a compiler 120 (or other software development tool) may be configured to determine which classes (e.g., which specializations) may be most likely to be used based on the source code and may specialize those classes at build time while allowing other classes (e.g., other specializations) to be specialized at runtime. In another embodiment, the number of classes to be specialized at build time may be based, as least partially, on particular target values related to application footprint size and/or application startup speed. In yet other embodiments, a compiler may utilize a combination of expected classes use, footprint size and/or startup speed when determining whether classes should be specialized at build time or runtime.

In general, the particular criteria used to determine whether to specialize any particular class at build time or runtime may also be based, at least in part, on user (e.g., programmer) input—either directly in the source code, or alternatively via one or more user interface modules (e.g., of application building software), according to one embodiment.

Thus, systems implementing metadata-driven dynamic specialization may perform specialization early (e.g., before runtime) to generate classes that are known to be needed and therefore allow the app to start up faster (e.g., while possibly not generating every possible specialization), while also dynamically specializing classes at runtime that were not specialized earlier.

While described above regarding the specialization of type-specific byte codes, metadata-driven dynamic specialization may also be utilized for instructions (e.g., byte codes) that manipulate various types of data. For instance, in one Java-based example, metadata-driven dynamic specialization may also utilized in conjunction with, for example, the dup, invoke, getfield byte codes, as well as with stack map frames, local variable type maps, etc.

Additionally, metadata-driven dynamic specialization may also be utilized by other components and/or services (either stand alone or part of a virtualized runtime environment), according to some embodiments. For example, debugging, profiling, local variable type tables, garbage collection, etc., may also take advantage of metadata-driven dynamic specialization as described herein. In general, virtually any aspect of software development, execution and/or debugging that involves manipulating data types may take advantage of, and/or implement, metadata-driven dynamic specialization. Thus, in some embodiments, specialization information (e.g., as defined by metadata-driven dynamic specialization) may be propagated to one or more components, such as to allow those components to determine specifics about the types of data that are being specialized and regarding the specialized versions of signatures being used. In other words, the annotated type information (e.g., the metadata) is in the annotated class file may inform multiple components/services (e.g., application execution, debugging, garbage collection, profiling, etc.).

An annotated class file may also contain other attributes that describe the types of data that are used by components (e.g., debugger, profiler, etc.) and some transformation according to metadata-driven dynamic specialization may be applied to those attributes as well, according to various embodiments. For example, an annotated class file may include metadata describing specialization information regarding one or more type tables used during debugging, according to one embodiment. Similarly, an annotated class file may include metadata describing specialization information regarding one or more stack map tables to be used during verification.

In some embodiments, a method for metadata-driven dynamic specialization may include generating, by a compiler, a class file based on a class declaration. Generating the class file may include applying a type erasure operation to a stream of instructions including the class declaration where the stream of instructions is intended for execution by a virtualized execution environment. The class declaration may include one or more type variables.

Additionally, in some embodiments, applying the type erasure operation may include creating an encoded form of a program element of the class declaration. The encoded form of the program element may include metadata specifying specialization information regarding the program element such that the encoded form can be specialized by the virtualized execution environment according to a particular type parameterization.

Applying the type erasure operation may involve including the encoded form of the program element in the class file, where the program element is usable by the virtualized execution environment to load the program element without regard to the presence of the metadata in the encoded form, according to some embodiments.

In some embodiments, a method for metadata-driven dynamic specialization may include determining, by a component of a virtualized runtime environment, that a program element within a class needs to be specialized according to a particular type parameterization. In response to determining that a program element needs to be specialized, the method may also include loading a class file including an encoded form of the program element, where the encoded form is to be transformed to generate a specialized version of the program element according to the particular type parameterization. Additionally, the encoded form may include metadata information allow the encoded form to be specialized according to the particular type parameterization. In some embodiments, the encoded form of the program element may be usable without regard to the presence of the metadata in the encoded form. Additionally, the method may include transforming the program element based on the encoded form to generate the specialized version of the program element, according to some embodiments.

Figure 7:
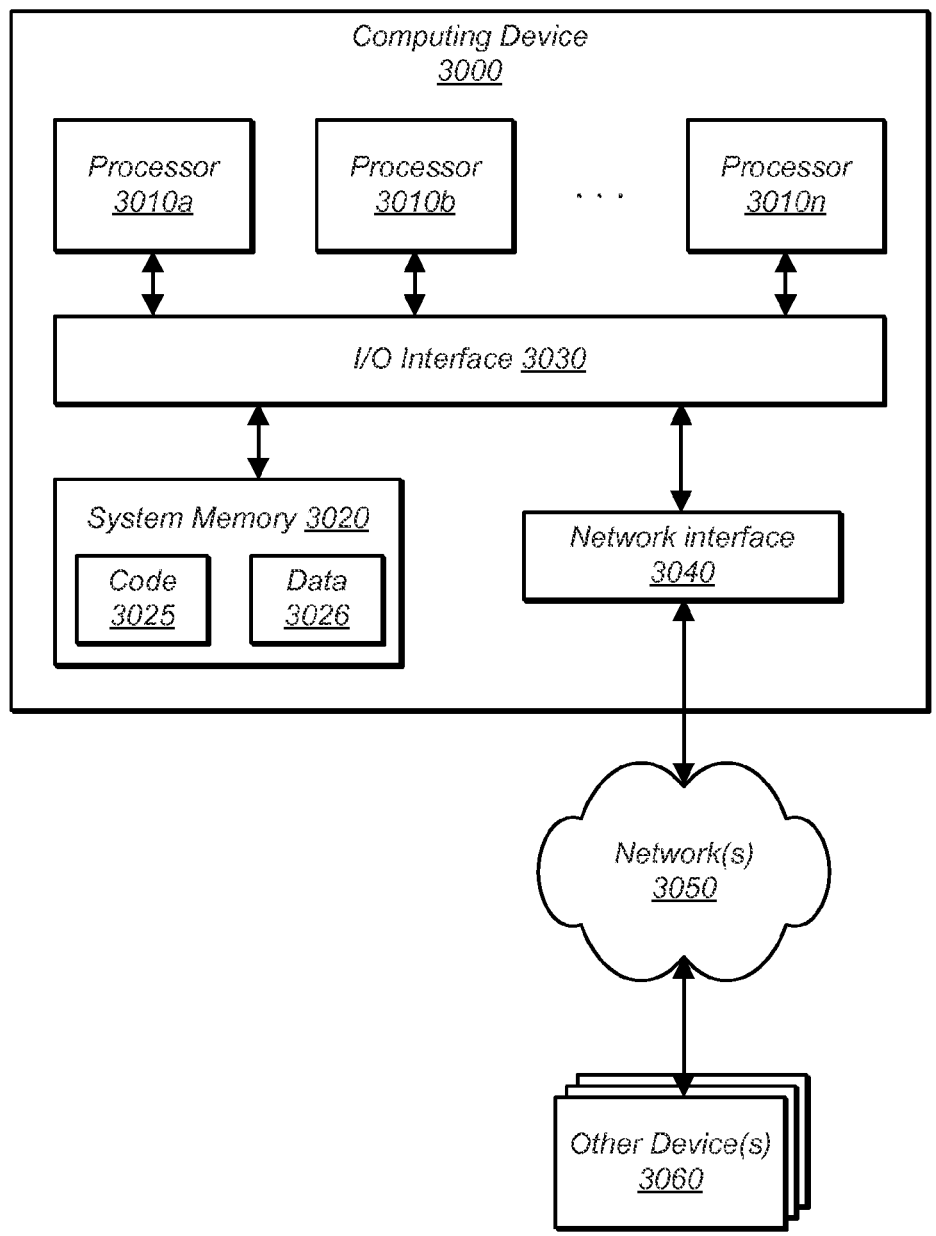
FIG. 7 is a logical block diagram illustrating an example computer system suitable for implementing metadata-driven dynamic specialization, as in one embodiment.

In at least some embodiments, a computer system that implements a portion or all of one or more of the technologies described herein may include a general-purpose computer system that includes or is configured to access one or more computer-readable media. FIG. 7 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing compiler 120 and/or virtualized runtime environment 140, described above.

In various embodiments, compiler 120 and/or virtualized runtime environment 140 (and/or any individual sub-modules thereof) may each be implemented in any of various programming languages or methods. For example, in one embodiment, compiler 120 and/or virtualized runtime environment 140 may be written in any of the C, C++, assembly, JAVA or other general purpose programming languages, while in another embodiment, one or more of them may be written using a different, more specialized, programming language. Moreover, in some embodiments, compiler 120 and/or virtualized runtime environment 140 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by Compiler 120 may, in some embodiments, be performed by virtualized runtime environment 140 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete compo-

19 nents in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A non-transitory, computer-readable storage medium storing program instructions that when executed on a computing device cause the computing device to perform:
   generating, by a compiler, a class file based on a class declaration, wherein said generating comprises:
   applying a type erasure operation to a stream of instructions for the class declaration, wherein the stream of instructions is for execution by a virtualized execution environment, and wherein the class declaration includes one or more type variables;
   wherein applying the type erasure operation comprises:
   encoding a program element of the class declaration with metadata to create an encoded form of the program element to provide type specialization, the metadata specifying specialization information regarding the program element indicating which of the type variables have been erased;
   including the encoded form of the program element in the class file, wherein the encoded form of the program element, when specialized for a particular type by the virtualized execution environment, is transformed based on the metadata to generate a specialized version of the program element according to a particular type parameterization for the particular type; and wherein
   the encoded form of the program element is also executable with no transformation by the virtualized execution environment.

2. The non-transitory, computer-readable storage medium of claim 1, wherein the program element comprises an instruction in the stream of instructions, wherein the instruction indicates that it operates on one or more values of references types.

3. The non-transitory, computer-readable storage medium of claim 2, wherein the metadata indicates that the one or more reference types are an erasure of one or more type variables of the class declaration.

4. The non-transitory, computer-readable storage medium of claim 2, wherein the metadata indicates that the one or more reference types are an erasure of one or more parameterized types that use one or more type variables of the class declaration as type arguments.

5. The non-transitory, computer-readable storage medium of claim 1, wherein the program element comprises an argument to an instruction in the stream of instructions, wherein the argument is a signature that indicates one or more reference types.

6. The non-transitory, computer-readable storage medium of claim 5, wherein the metadata indicates that the one or more reference types are an erasure of one or more type variables of the class declaration.

7. The non-transitory, computer-readable storage medium of claim 5, wherein the metadata indicates that the one or more reference types is an erasure of one or more parameterized types that use one or more type variables of the class declaration as type arguments.

8. The non-transitory, computer-readable storage medium of claim 1, wherein the stream of instructions occurs within one or more of:

20 a body of a method declaration in the class declaration, wherein the class declaration is a generic class declaration, or a body of a generic method declaration in a class declaration.

9. The non-transitory, computer-readable storage medium of claim 1, wherein the encoded form of the program element comprises a bytecode version of the stream of instructions, and wherein the metadata in the encoded form identifies one or more bytecodes to be adjusted to generate a specialized version of a class based on the class declaration.

10. A method implemented by executable instructions stored on memory of one or more computing devices, comprising:
    generating, by a compiler implemented on one or more computing devices, a class file based on a class declaration, wherein said generating comprises:
    applying a type erasure operation to a stream of instructions for the class declaration, wherein the stream of instructions is for execution by a virtualized execution environment, and wherein the class declaration includes one or more type variables;
    wherein applying the type erasure operation comprises:
    encoding a program element of the class declaration with metadata to create an encoded form of the program element to provide type specialization, the metadata specifying specialization information regarding the program element indicating which of the type variables have been erased;
    including the encoded form of the program element in the class file, wherein the encoded form of the program element, when specialized for a particular type by the virtualized execution environment, is transformed based on the metadata to generate a specialized version of the program element according to a particular type parameterization for the particular type; and wherein
    the encoded form of the program element is also executable with no transformation by the virtualized execution environment.

11. The method of claim 10, wherein the program element comprises an instruction in the stream of instructions, and wherein said applying the type erasure operation further comprises:
    determining that the instruction indicates that it operates on one or more values of one or more references types; and
    based at least in part on said determining, including in the encoded form of the program element an indication that the instruction operates on the one or more values of the one or more reference types.

12. The method of claim 11, wherein said creating an encoded form comprises:
    including in the metadata an indication that the one or more reference types are an erasure of one or more type variables of the class declaration.

13. The method of claim 11, wherein said creating an encoded form comprises:
    including in the metadata an indication that the one or more reference types are an erasure of one or more parameterized types that use one or more type variables of the class declaration as type arguments.

14. The method of claim 10, wherein the program element comprises an argument to an instruction in the stream of instructions, wherein the argument is a signature indicating one or more reference types, and wherein said applying the type erasure operation further comprises:
including in the encoded form of the program element an indication that the signature indicates the one or more reference types.

15. The method of claim 14, wherein said creating an encoded form comprises:
including in the metadata an indication that the one or more reference types are an erasure of one or more type variables of the class declaration.

16. The method of claim 14, wherein said creating an encoded form comprises:
including in the metadata an indication that the one or more reference types are an erasure of one or more parameterized types that use one or more type variables of the class declaration as type arguments.

17. The method of claim 10, wherein the stream of instructions occurs within one or more of:
a body of a method declaration in the class declaration, wherein the class declaration is a generic class declaration, or
a body of a generic method declaration in a class declaration.

18. The method of claim 10, wherein said creating an encoded form comprises:
including a bytecode version of the stream of instructions in the encoded form of the program element; and
including, in the metadata in the encoded form, information that identifies one or more bytecodes that need to be adjusted in order to generate a specialized version of a class based on the class declaration.

19. A non-transitory, computer-readable storage medium storing program instructions that when executed on a computing device cause the computing device to perform:
determining, by a component of a virtualized runtime environment, that a program element within a class needs to be specialized according to a particular type parameterization;
loading, in response to said determining, a class file comprising an encoded form of the program element of the class, wherein the encoded form is generated with added metadata prior to runtime by applying a type erasure operation and is to be transformed at runtime to generate a specialized version of the program element according to the particular type parameterization,
transforming the program element based on the encoded form to generate the specialized version of the program element according to the particular type parameterization.

20. The non-transitory, computer-readable storage medium of claim 19, wherein the program element comprises one or more of:
a class signature;
a method signature;
an instruction; or
an argument to an instruction.

* * * * *